(12) United States Patent
Mather et al.

(10) Patent No.: US 10,081,746 B2
(45) Date of Patent: Sep. 25, 2018

(54) CONFORMABLE REVERSIBLE ADHESIVES WITH SHAPE MEMORY ASSISTED DELAMINATION

(71) Applicants: Patrick T. Mather, Lewisburg, PA (US); Jaimee Marie Robertson, Cortland, NY (US)

(72) Inventors: Patrick T. Mather, Lewisburg, PA (US); Jaimee Marie Robertson, Cortland, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 120 days.

(21) Appl. No.: 15/388,336

(22) Filed: Dec. 22, 2016

(65) Prior Publication Data
US 2018/0179425 A1 Jun. 28, 2018

Related U.S. Application Data

(60) Provisional application No. 62/271,026, filed on Dec. 22, 2015.

(51) Int. Cl.
| | | |
|---|---|---|
| *C09J 175/04* | (2006.01) | |
| *C09J 167/04* | (2006.01) | |
| *C09J 183/10* | (2006.01) | |

(52) U.S. Cl.
CPC ............ *C09J 175/04* (2013.01); *C09J 167/04* (2013.01); *C09J 183/10* (2013.01)

(58) Field of Classification Search
CPC ...... C09J 175/04; C09J 167/04; C09J 175/08; C09J 175/16; C09J 183/00; C09J 183/04; C09J 183/06; C09J 183/08; C09J 183/10; C09J 183/12; C08G 77/00; C08G 77/04; C08G 77/458; C08G 77/70
See application file for complete search history.

(56) References Cited

U.S. PATENT DOCUMENTS

| | | | |
|---|---|---|---|
| 2011/0021097 A1* | 1/2011 | Mather | ..................... C08J 5/046 442/60 |
| 2011/0217547 A1* | 9/2011 | Mather | ................. B29C 61/003 428/339 |

OTHER PUBLICATIONS

Robertson, et al. "Dual-Spun Shape Memory Elastomeric Composites", ACS Macro Letters, 4, pp. 43-440, Apr. 1, 2015 (Year: 2015).*
Bauer, et al. "Electrospun Poly(ε-caprolactone)/Polyhedral Oligomeric Silsesquioxane-Based Copolymer Blends: Evolution of Fiber Internal Structures", Macromolecular Bioscience, 16, pp. 705-716, Jan. 19, 2016. (Year: 2016).*
Xia, et al. "Poly(E-caprolactone)/polyhedral oligomeric silsesquioxane hybrids: Crystallization behavior and thermal degradation", Journal of Applied Polymer Science, 133 (48), 44113, Aug. 23, 2016. (Year: 2016).*

* cited by examiner

*Primary Examiner* — Christopher M Rodd
(74) *Attorney, Agent, or Firm* — Bond Schoeneck & King, PLLC; David Nocilly; George McGuire

(57) ABSTRACT

A shape memory elastomeric composite that has temperature-controlled, shape memory, and reversible adhesive properties, and is soft enough to confirm to an irregular surface. The composite is formed from a synthesized polyhedral oligomeric silsesquioxane-containing thermoplastic polyurethane elastomer and poly(ε-caprolactone) by electrospinning the two components separately and simultaneously and then hot compacting the electrospun composition to form a dense film.

13 Claims, 10 Drawing Sheets

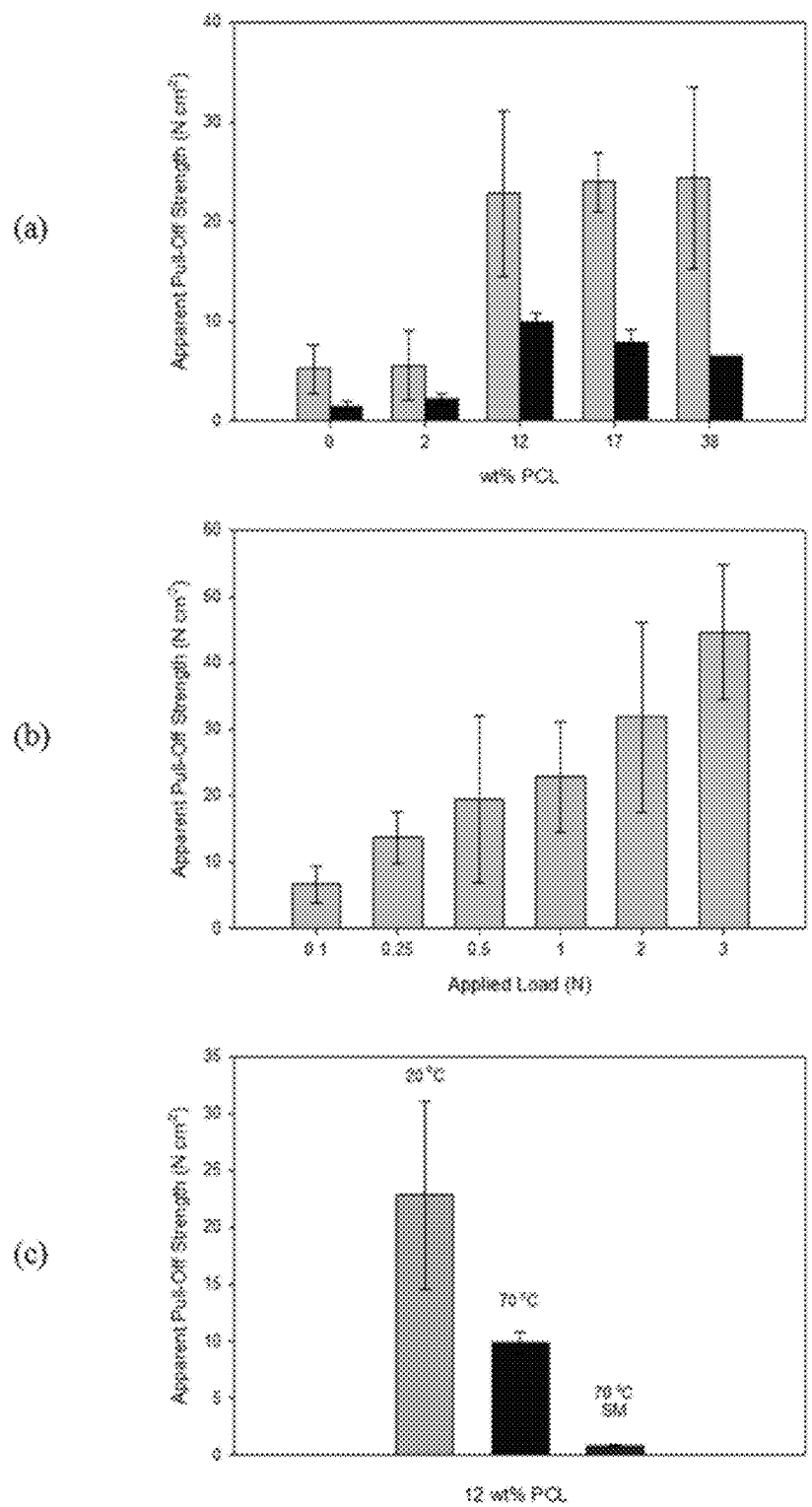
FIG. 7(a) through (c)

CONFORMABLE REVERSIBLE ADHESIVES WITH SHAPE MEMORY ASSISTED DELAMINATION

CROSS-REFERENCE TO RELATED APPLICATIONS

This application claims priority to U.S. Provisional Application No. 62/271,026, filed on Dec. 22, 2015.

STATEMENT REGARDING FEDERALLY SPONSORED RESEARCH

This invention was made with government support under Grant CMMI-1334658 awarded by the National Science Foundation. The government has certain rights in the invention.

BACKGROUND OF THE INVENTION

1. Field of the Invention

The present invention relates to adhesives and, more specifically, to a shape memory based reversible adhesive that is soft.

2. Description of the Related Art

The development of adhesives with varying properties and strengths has enabled the choosing of an adhesive to directly meet the needs of a given application. For example, a particular application may need a certain bond strength, a given thermal stability, or a prescribed rigidity. In classifying adhesives, categories based on adhesive type can be used; thermosetting, pressure sensitive, and contact adhesives are among the present categories, and each type has limited applicability. Nature, namely geckos, frogs, and insects, have inspired the development of adhesive systems with the ability to switch between an adhesive state and a non-adhesive state, referred to as reversible adhesives that can controllably debond from the adhering surface. Such semi-permanent cohesion provides versatility not provided by traditional adhesives. For example, using a reversible adhesive in place of a permanent adhesive enables simple disassembly of structures for part repair or replacement.

Conventional reversible adhesives may be made from shape memory polymers, which are polymers with the ability to fix a temporary shape, while memorizing their permanent form. The deformed SMP can indefinitely hold the temporary shape. Activation via an external stimulus, such as heat, light, electricity, or magnetic fields triggers recovery back to the permanent shape. SMPs are relatively rigid in their fixed states, however, due to the need for a switching mechanism to lock in the temporary shape.

As a result, reversible adhesives made with shape memory polymers may only be used on planar surfaces. Accordingly, there is a need in the art for a reversible adhesive that is soft and can conform and adhere to curved or textured surfaces as well as flat surfaces.

BRIEF SUMMARY OF THE INVENTION

The present invention is an elastomeric composite with temperature-controlled shape memory and reversible adhesive properties that can conform to an irregular surface and controllably bond and debond from the surface. More specifically, the reversible adhesive comprises a composite mat having a first set of fibers and a second set of fibers that are dispersed and intertwined together, wherein the first set of fibers comprise poly(ε-caprolactone) and wherein the second set of fibers comprise a polyhedral oligomeric silsesquioxane-containing thermoplastic polyurethane elastomer. The poly(ε-caprolactone) fibers have a melting point of around 56 degrees Celsius. The polyhedral oligomeric silsesquioxane-containing thermoplastic polyurethane elastomer fibers have a glass transition temperature of around minus 54 degrees Celsius, a first melting point of around degrees Celsius, and a second melting point of around 116 degrees Celsius. The poly(ε-caprolactone) fibers comprise between two and 38 weight percent of the composite mat. The composite mat is characterized by at least one thousand percent strain prior to failure. The composite mat has a Young's modulus from 6 to 30 MPa.

The invention also comprises the method of providing a reversible adhesive by the steps of providing a composite mat having a first set of fibers and a second set of fibers that are dispersed and intertwined together, wherein the first set of fibers comprise poly(ε-caprolactone) and the second set of fibers comprise a polyhedral oligomeric silsesquioxane-containing thermoplastic polyurethane elastomer, heating the composite mat above a melting temperature of the poly(ε-caprolactone) fibers, and contacting the heated composite mat to a substrate. The method also includes the preliminary step of simultaneously electrospinning the first set of fibers with the second set of fibers to make the composite mat of dispersed and intertwined fibers.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figures 3A, 3B, 3C:
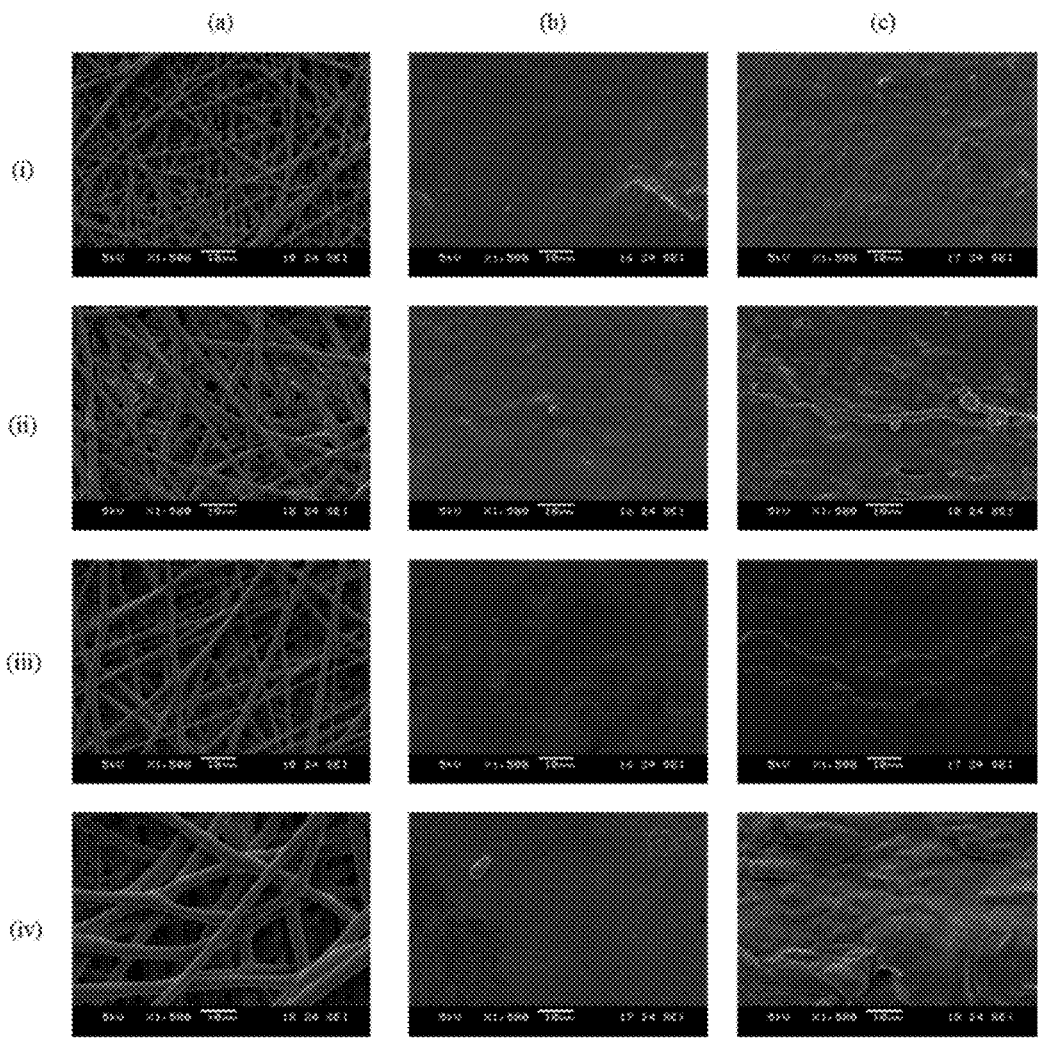
Figure 4:
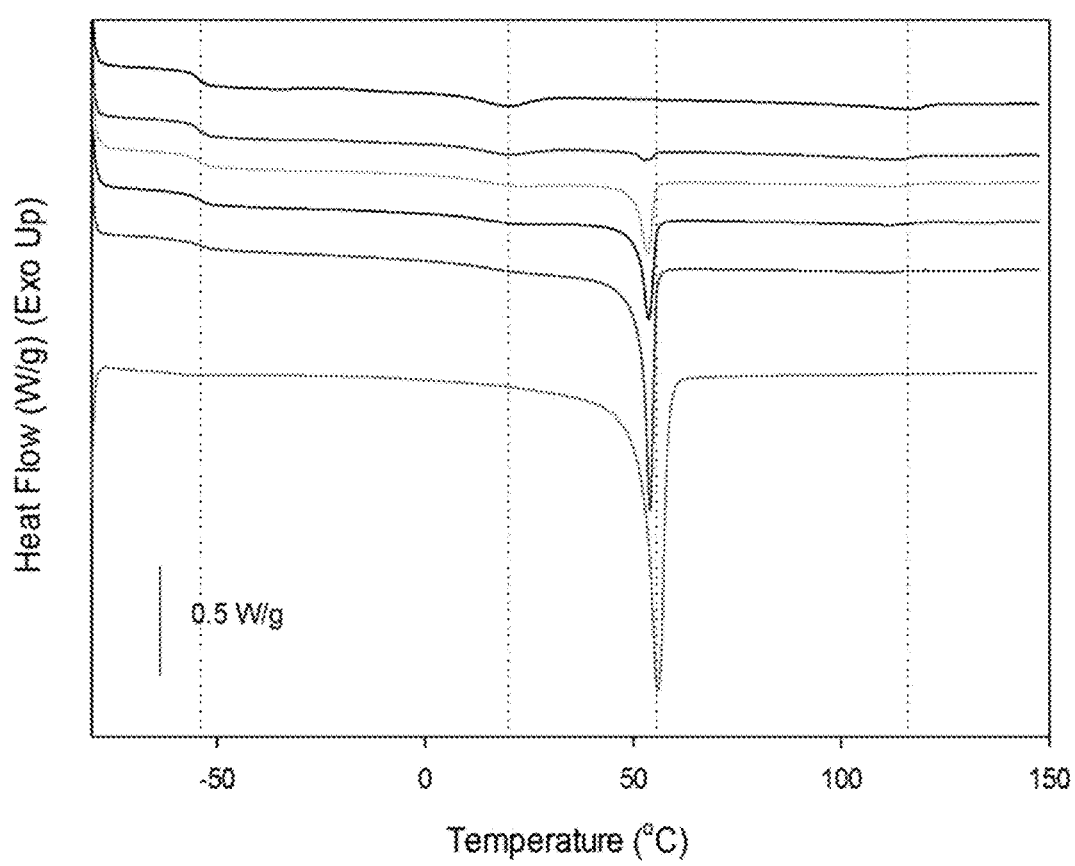
Figures 5A, 5B:
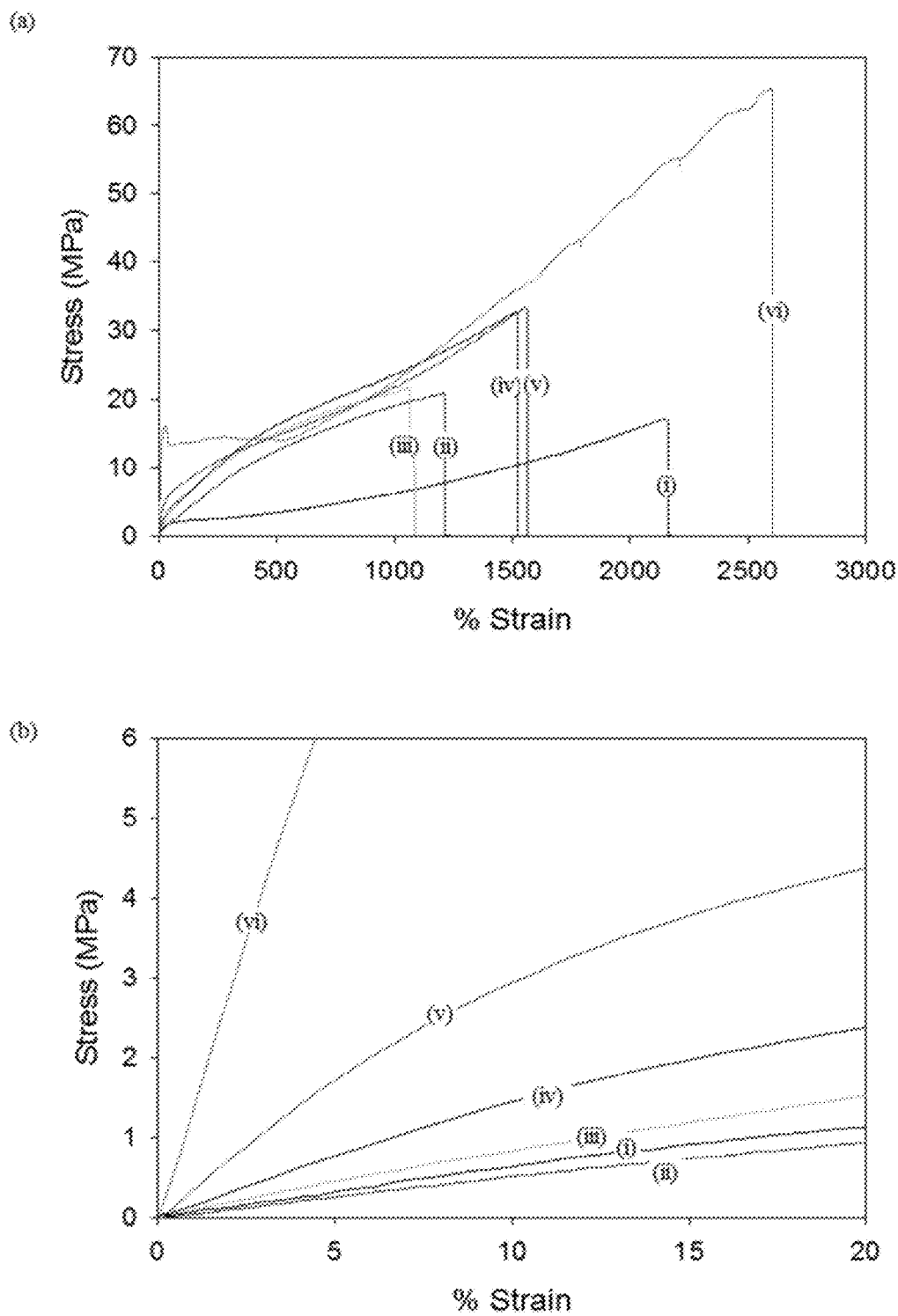
Figure 6A:
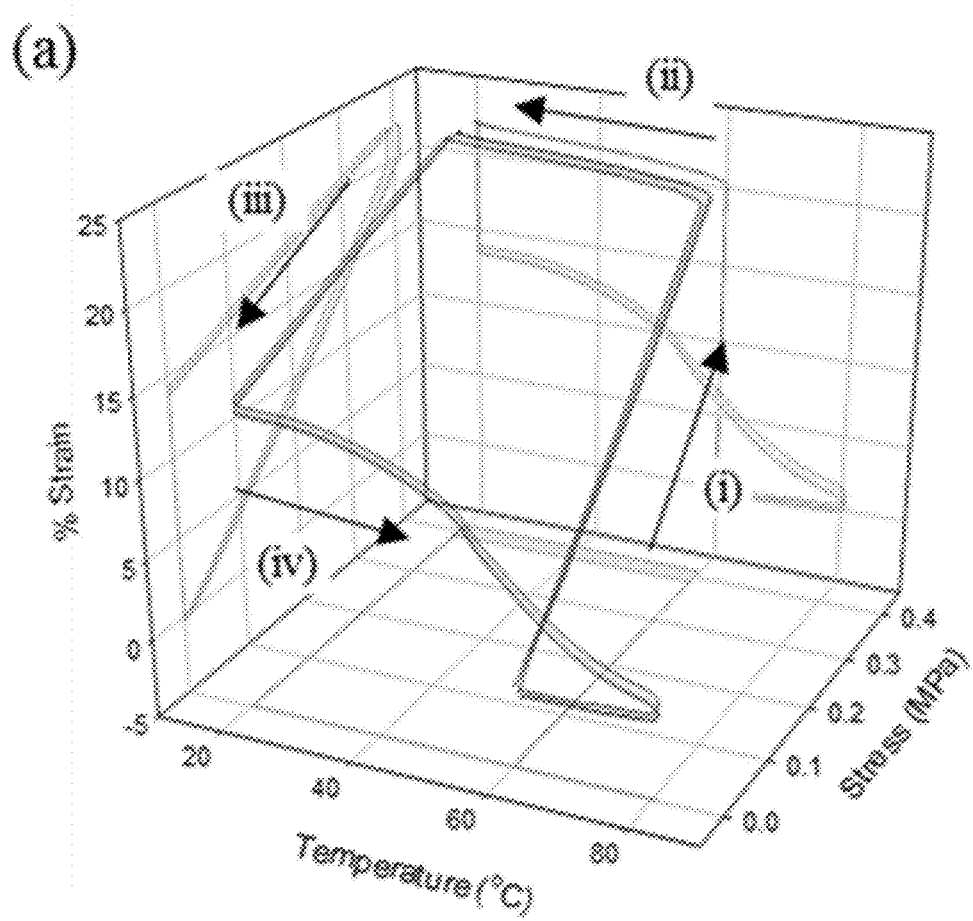
Figure 6B:
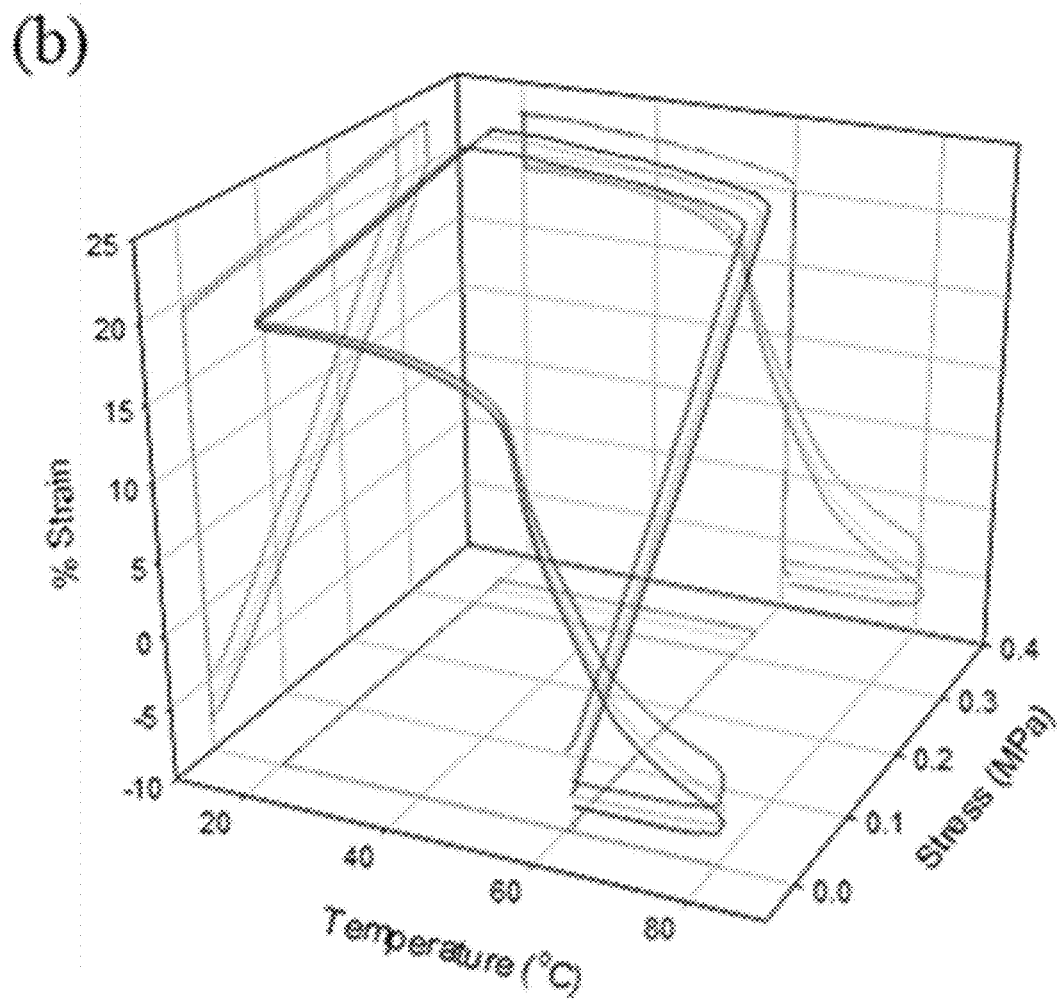
Figure 6C:
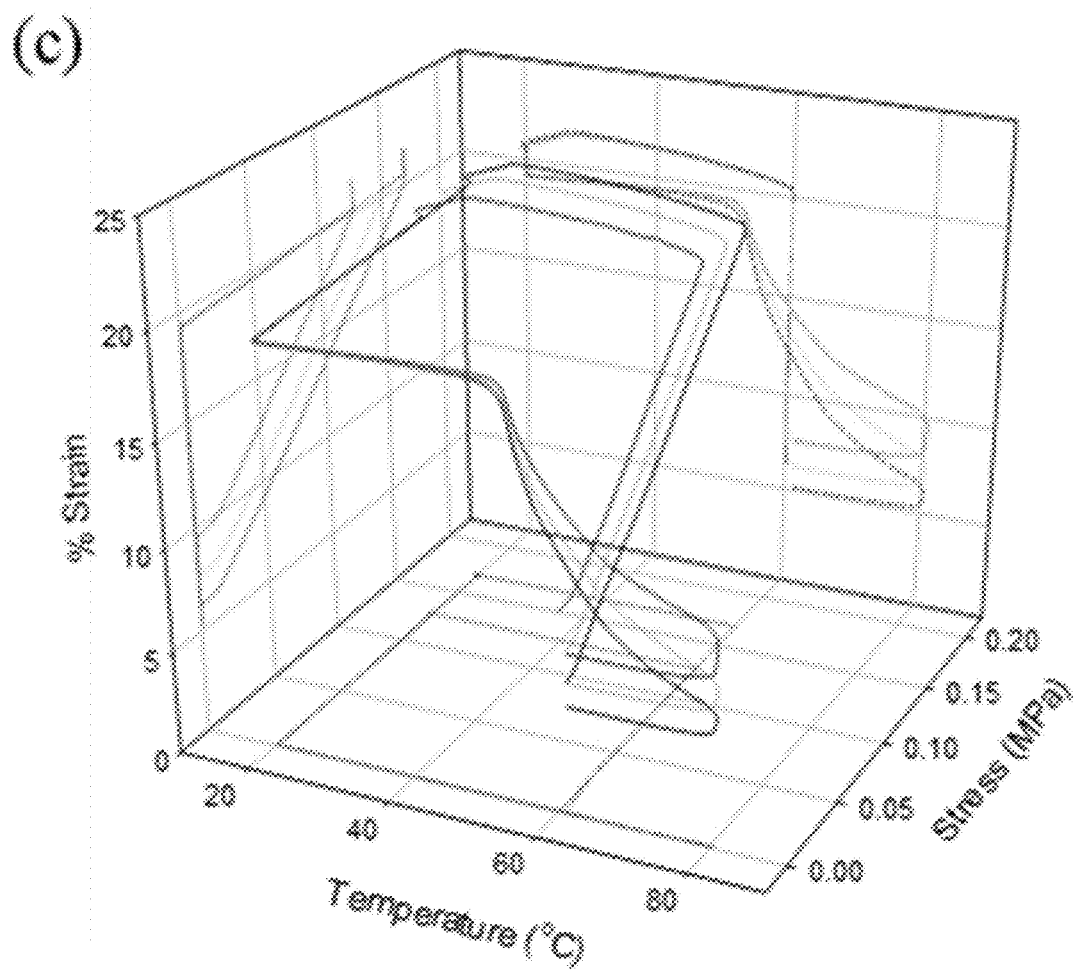
Figure 6D:
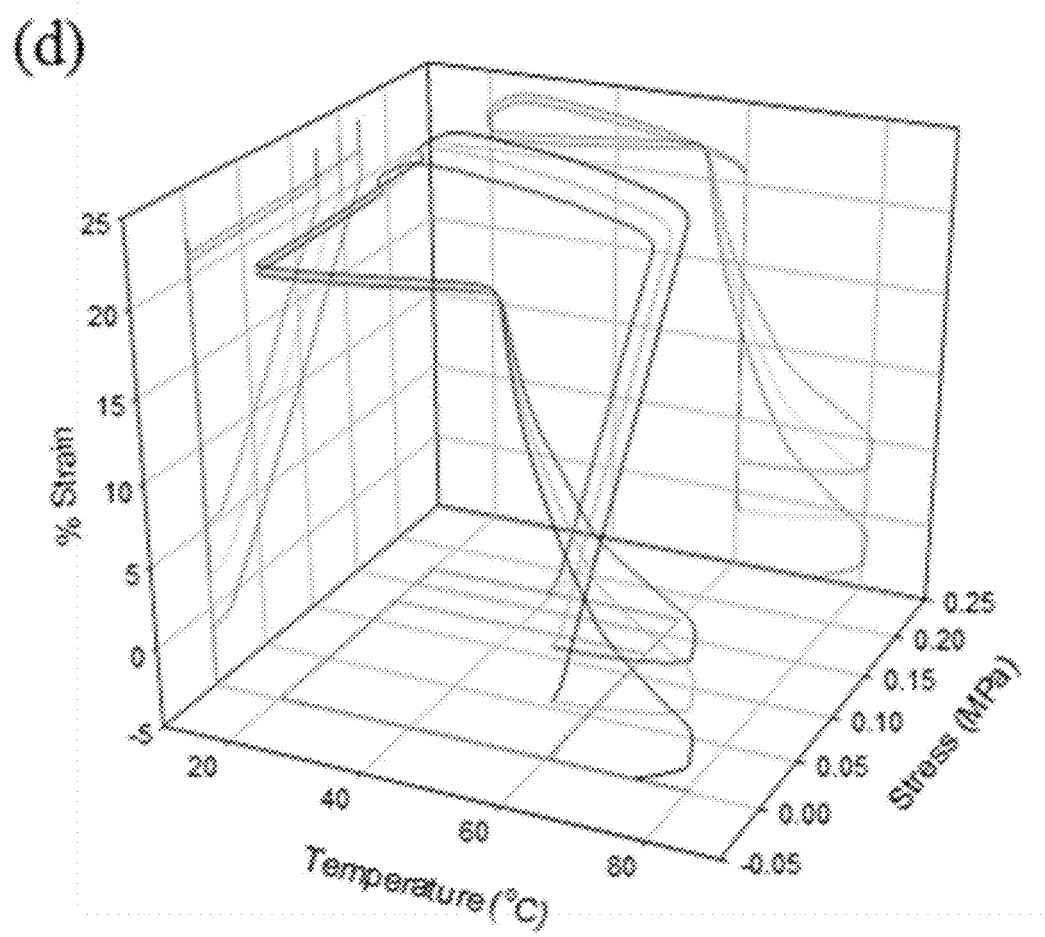

FIGS. 3(a) through 3(c) are scanning electron microscopy images of (a) composite fibers, (b) SMEC film surfaces, and (c) cross-sections of the SMEC films with (i) 2, (ii) 12, (iii) 17, and (iv) 38 wt % PCL;

FIG. 4 is a graph of DSC second heating curves for the PCL/POSS-TPU SMECs containing: (i) 0 (neat POSS-TPU), (ii) 2, (iii) 12, (iv) 17, (v) 38, and (vi) 100 (neat PCL) wt % PCL, where all heating and cooling rates were 10° C. min$^{-1}$;

FIGS. 5(a) and 5(b) are tensile stress-strain curves indicating: (a) the high elongation and (b) the Young's moduli of the SMECs containing (i) 0 (neat POSS-TPU), (ii) 2, (iii) 12, (iv) 17, (v) 38, and (vi) 100 (neat PCL) wt % PCL;

FIGS. 6(a) through 6(d) are three-dimensional stress-temperature-strain plots demonstrating the shape memory capabilities of the SMECs containing (a) 2, (b) 12, (c) 17, and (d) 38 wt % PCL. In (a), the steps of the shape memory cycle are indicated by arrows as follows: (i) shape programming; at 60° C., dog bone shaped films (ASTM D63, ¼ scale) were stretched to 20% strain by ramping the tensile force at 0.02 N min$^{-1}$; (ii) shape fixing; the temporary shape was fixed into the composite by ramping the temperature to 20° C. (below PCL's crystallization temperature); (iii) unloading; the shape fixing ability was observed by unloading the applied force at 0.05 N min$^{-1}$ to 0.001 N; (iv) shape recovery; the programmed strain was recovered by heating the films to 80° C., which melted the PCL, allowing elastic contraction; and FIGS. 7(a) through 7(c) are graphs of the adhesive characterization of the SMEC films as follows: (a) apparent pull-off strengths for the SMECs with varying PCL content. The adhesive strength was tested at 20° C. (gray) with the PCL crystallized (adhered) to the steel clamp and at 70° C. (blue) with the PCL melted (debonded). The adhesive strength was significantly reduced by melting the PCL, indicating reversibility in adhesion. (b) Effect of applied load on adhesive strength for the SMEC containing 12 wt % PCL. With increasing applied load, the apparent pull-off strength increased. Thus, the SMECs behave also as pressure-sensitive adhesives. (c) Comparison of pull-off strengths for the 12 wt % SMEC adhered at 20° C. (bonded, gray), 70° C. (debonded, blue), and 70° C. with shape memory assisted delamination (debonded, red). Exploitation of the shape memory properties reduced the delamination force to nearly 0 N.

DETAILED DESCRIPTION OF THE INVENTION

Figure 1:
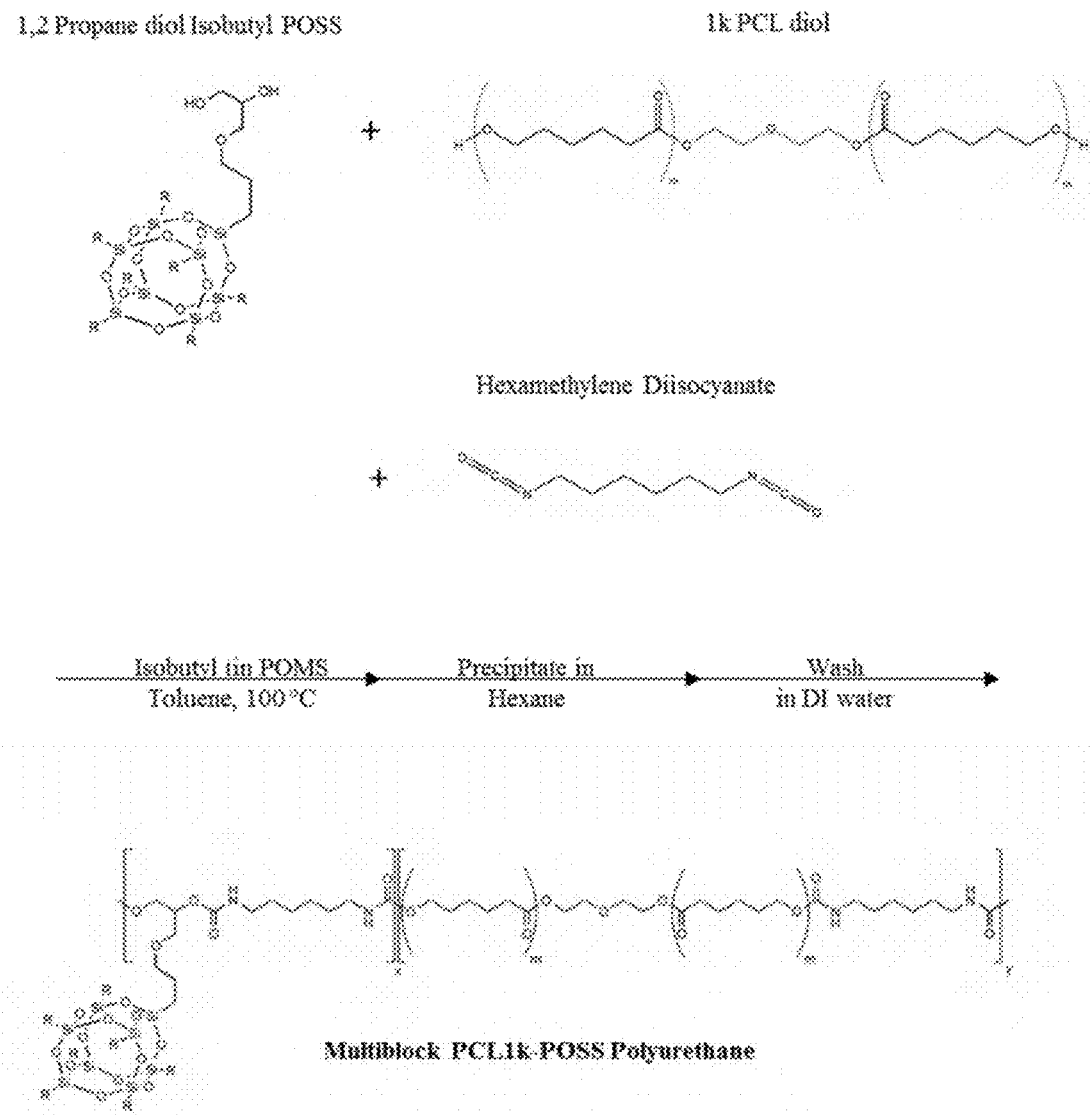
FIG. 1 is a schematic of a reaction mechanism used to synthesize a multiblock polyurethane elastomer according to the present invention.

Referring now to the drawings, wherein like reference numerals refer to like parts throughout, there is seen in FIG. 1 a reaction mechanism for synthesizing an elastomer that is soft enough to conform to an irregular surface. Poly(ε-caprolactone) (PCL, $M_n$=70-90 kg mol$^{-1}$) and a synthesized polyhedral oligomeric silsesquioxane-containing thermoplastic polyurethane elastomer (POSS-TPU), with the synthesis mechanism also seen in FIG. 1, were used to form the soft, shape memory polymer composite. More specifically, the polyhedral oligomeric silsesquioxane-containing thermoplastic polyurethane elastomer was formed from 1,2 propane diol isobutyl polyhedral oligomeric silsesquioxane (POSS) and low molecular weight poly(ε-caprolactone) (PCL1k, 1.25 kg mol$^{-1}$) that were combined in a 70:30 mass ratio PCL1k:POSS. Hexamethylene diisocyanate (HDI) was added to achieve initially a 0.95:1 molar ratio HDI:monomer. The components were dissolved in toluene, heated to 100° C., and isobutyl tin POMS catalyst was added (0.1 wt %). Additional HDI was added in 12 μL increments until a molar ratio of 1.05:1 HDI:monomer was achieved. The synthesized product, POSS-TPU, was subsequently precipitated in cold n-hexanes, washed in deionized water, and dried.

Figure 2:
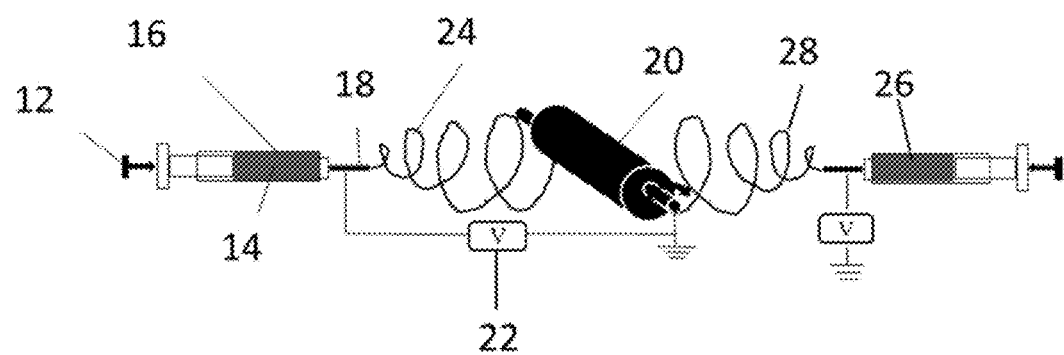
FIG. 2 is a schematic of a dual-electrospinning setup used to simultaneously electrospin PCL and the synthesized POSS-TPU where syringes containing each solution were placed on opposing sides of the rotating and translating collector drum to minimize interference from the electric fields.

PCL and POSS-TPU were separately dissolved in 80:20 volume ratio chloroform:N,N-dimethylformamide (DMF) mixtures to obtain 20 and 40% (w/v) solutions, respectively. The two polymer solutions were then electrospun separately and simultaneously, as seen in FIG. 2, with the resulting fibers collected on the same mandrel to obtain composite mats with well dispersed and intertwined fibers of both polymers. More specifically, the electrospinning system 10 comprised a syringe pump 12 for delivering a polymer solution 14 through the metallic needle 16 of a syringe 18. The metallic needle 16 and a metal collector 20 are coupled to a high voltage supply 22 so that a charged jet 24 from needle 16 can be collected by metal collector 20. A second syringe 26 is similarly used to provide a second charged jet 28 for collection on metal collector 20.

The flow rates and voltages used to electrospin the fibers were varied to adjust the relative composition of the composite. Table 1 below contains the electrospinning parameters used for each composition. The needle-to-mandrel distances were kept constant at about 6 cm. The composite fibers were subsequently subjected to hot compaction (80° C., 1 metric ton), during which the PCL was melted to form a dense film, as seen in FIG. 3.

TABLE 1

Summary of dual-electrospinning conditions used to fabricate the SMECs

| Nominal PCL content[a] (wt %) | Dual-electrospinning conditions | PCL content[b] (wt %) |
|---|---|---|
| 5 | PCL—0.2 mL h$^{-1}$, 10 kV POSS-TPU—5.0 mL h$^{-1}$, 14.5 kV | 2 |
| 18 | PCL—0.8 mL h$^{-1}$, 11 kV POSS-TPU—5.0 mL h$^{-1}$, 14.5 kV | 12 |
| 26 | PCL—0.4 mL h$^{-1}$, 10 kV POSS-TPU—1.5 mL h$^{-1}$, 14 kV | 17 |
| 31 | PCL—1.0 mL h$^{-1}$, 12 kV POSS-TPU—3 mL h$^{-1}$, 12 kV | 38 |

[a]Based on relative flow rates used in dual electrospinning
[b]Calculated from the ratio of enthalpies of melting of PCL in the SMEC to neat PCL Differential scanning calorimetry (DSC) was used to measure the transition temperatures of the composites and components and to estimate the PCL incorporation, as seen in FIG. 4. The neat POSS-TPU exhibited a glass transition temperature around −54° C., a melting point around 20° C., and a second melting point around 116° C. The PCL melting point was measured around 56° C. The composites exhibited all transitions of the neat components with unchanged temperatures. The PCL content was measured by comparing the enthalpy of melting of PCL in the composite to that of neat PCL. The PCL content ranged from 2 to 38 wt % PCL (calculated values provided in Table 1). Such calculated values have been used to define the composition. Control over composition is pertinent to material properties and performance, and the dual-electrospinning method enables adjustment of composition.

The soft, elastomeric nature of the SMECs is one of the unique attributes of the reversible adhesive system of the present invention. To demonstrate the low modulus and high elongation of the composites, tensile mechanical testing was utilized. Dog bone shaped samples (ASTM D638, ¼ scale) were stretched at 33 μm s$^{-1}$ to failure. Referring to FIG. 5, the SMECs of the present invention had high strain-to-failures, with all compositions reaching over 1000% strain prior to failure, as seen in FIG. 5(a). Furthermore, the moduli were relatively low, as is indicative of elastomers. The Young's moduli, taken as the slopes of the initial regions of the stress-strain curves, as seen in FIG. 5(b), ranged from 6 to 30 MPa, with increasing modulus with more PCL incorporation.

Referring to FIG. 6(a) through (d), the shape memory capabilities of the dual-spun SMECs of the present invention were tested using a dynamic mechanical analyzer. At elevated temperature, the films were stretched to 20% strain in a tensile configuration. After cooling and unloading, the fixing ability was observed. Subsequent heating recovered the permanent form, and the shape recovery was measured. The shape fixing, characterized by degree of strain maintained during unloading, improved with increasing PCL content since PCL crystallization fixed the temporary shape. All compositions had good shape recovery, as was indicated by the return of the strain to near the initial value after heating.

The adhesive strength of the SMECs of the present invention was tested using the dynamic mechanical analyzer in compression mode. Circular shaped samples were compressed with 1 N force, and then the temperature was ramped to 70° C. At 70° C., the PCL was melted, softening the film further. The temperature was subsequently cooled to 20° C. to crystallize the PCL and adhere the SMEC of the present invention to the steel clamps. The force was then ramped in the reverse direction until a tensile force high enough to delaminate the film from the clamp was applied. The measured force at delamination was normalized by the initial cross sectional area in contact with the clamp to obtain the apparent pull-off strength of the adhesive. This method was used for all compositions to determine the effect of PCL on the adhesive strength. With increasing PCL content, the apparent pull-off strength increased as seen in FIG. 7(a). Similarly, the effect of the applied load was determined by varying the applied compressive force between 0.1 and 3 N. Referring to FIG. 7(b), for a SMEC film with 12 wt % PCL, the apparent pull-off strength increased with applied load, indicating that the SMECs of the present invention perform as pressure-sensitive adhesives.

As reversible adhesives, the SMECs of the present invention should easily delaminate from the steel clamps at temperatures above PCL's melting point. Under such conditions, the PCL, which is the component adhering the SMEC to the surface, is melted, and thus the adhesive abilities are reversed. Similar methods to those describe previously were used, but prior to unloading the 1 N force, the temperature was again ramped to 70° C. At this elevated temperature, the compressive force was unloaded, and a tensile force was applied until the film delaminated from the clamps. With the PCL melted, the apparent pull-off strengths were less than half of the values measured when PCL was crystallized, as seen in FIG. 7(a). Hence, the SMECs are reversible adhesives.

While the adhesive force necessary to delaminate the SMECs of the present invention was reduced upon heating, a significant force was still required to separate the SMEC from the clamp surface. To further reduce the adhesive strength, the shape memory properties were exploited. Prior to loading the SMEC for reversible adhesive testing, the film was stretched to 50% tensile strain above PCL's melting point and this strain was "fixed" upon cooling and crystallization of the PCL, exploiting the shape memory fixing phenomenon exhibited by the SMEC. When the compressive force was unloaded during delamination (at elevated temperature), the film length decreased as the strain was recovered. This change in length resulted in reduced surface area in contact with the clamp, while also disrupting physical interactions between the SMEC and the steel surfaces, and the adhesive strength was reduced to <1 N/cm², perceived as negligible, as seen in FIG. 7(c).

Reversible adhesive properties can be utilized in home improvement or medical adhesives, in manufacturing as a clamping mechanism (for example, the mounting of an optical lens for polishing), or in packaging materials. The unique combination of reversible adhesion and flexibility differentiates the SMEC system of the present invention from other reversible adhesives and such flexibility is advantageous for conformation to curved or textured surfaces.

In lieu of the POSS-based thermoplastic elastomer, other thermoplastic elastomers that are soluble in a solvent for electrospinning and have a hard-block $T_m$ at least 20° C. higher than the $T_m$ of the PCL component (about 58° C.). For example, Pellethane, PEBAX, or other commercial elastomers such as THERMOLAST®, HIPEX®, COPEC®, and For Tec E® (KRAIBURG TPE), Santoprene (ExxonMobil), Termoton by Termopol Polimer, Arnitel (DSM), Solprene (Dynasol), Engage (Dow Chemical), Hytrel (Du Pont), Dryflex and Mediprene (ELASTO), Kraton (Kraton Polymers), Pibiflex may be configured for use instead of the POSS-based thermoplastic elastomer.

What is claimed is:

1. A reversible adhesive, comprising:
   a composite mat having a first set of fibers and a second set of fibers that are dispersed and intertwined together;
   wherein the first set of fibers comprises poly(ε-caprolactone) fibers; and
   wherein the second set of fibers comprises polyhedral oligomeric silsesquioxane-containing thermoplastic polyurethane elastomer fibers.

2. The adhesive of claim 1, wherein the poly(ε-caprolactone) fibers have a melting point of around 56 degrees Celsius.

3. The adhesive of claim 2, wherein the polyhedral oligomeric silsesquioxane-containing thermoplastic polyurethane elastomer fibers have a glass transition temperature of around minus 54 degrees Celsius, a first melting point of around degrees Celsius, and a second melting point of around 116 degrees Celsius.

4. The adhesive of claim 3, wherein the poly(ε-caprolactone) fibers comprise between two and 38 weight percent of the composite mat.

5. The adhesive of claim 4, wherein the composite mat is characterized by at least one thousand percent strain prior to failure.

6. The adhesive of claim 5, wherein the composite mat has a Young's modulus from 6 to 30 MPa.

7. A method of providing a reversible adhesive, comprising:
   providing a composite mat having a first set of fibers and a second set of fibers that are dispersed and intertwined together, wherein the first set of fibers comprises poly(ε-caprolactone) fibers and the second set of fibers comprises polyhedral oligomeric silsesquioxane-containing thermoplastic polyurethane elastomer fibers;
   heating the composite mat above a melting temperature of the poly(ε-caprolactone) fibers; and
   contacting the heated composite mat to a substrate.

8. The method of claim 7, further comprising the step of simultaneously electrospinning the first set of fibers with the second set of fibers to form the composite mat of dispersed and intertwined fibers.

9. The method of claim 8, wherein the poly(ε-caprolactone) fibers have a melting point of around 56 degrees Celsius.

10. The method of claim 9, wherein the polyhedral oligomeric silsesquioxane-containing thermoplastic polyurethane elastomer fibers have a glass transition temperature of around minus 54 degrees Celsius, a first melting point of around degrees Celsius, and a second melting point of around 116 degrees Celsius.

11. The method of claim 10, wherein the poly(ε-caprolactone) fibers comprise between two and 38 weight percent of the composite mat.

12. The method of claim 11, wherein the composite mat is characterized by at least one thousand percent strain prior to failure.

13. The method of claim 12, wherein the composite mat has a Young's modulus from 6 to 30 MPa.

* * * * *